US009036829B2

(12) United States Patent
Lee

(10) Patent No.: US 9,036,829 B2
(45) Date of Patent: May 19, 2015

(54) ADAPTIVE NOTCH FILTER WITH VARIABLE BANDWIDTH, AND METHOD AND APPARATUS FOR CANCELING HOWLING BY USING THE ADAPTIVE NOTCH FILTER WITH VARIABLE BANDWIDTH

(75) Inventor: Jun-ho Lee, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 790 days.

(21) Appl. No.: 13/027,833

(22) Filed: Feb. 15, 2011

(65) Prior Publication Data

US 2011/0216910 A1 Sep. 8, 2011

(30) Foreign Application Priority Data

Mar. 5, 2010 (KR) ........................ 10-2010-0020064

(51) Int. Cl.
*H04B 15/00* (2006.01)
*H04B 3/20* (2006.01)
*H04R 3/02* (2006.01)

(52) U.S. Cl.
CPC ........................................ *H04R 3/02* (2013.01)

(58) Field of Classification Search
CPC ............ H04B 3/20; H04B 15/00; H04R 3/02; H04R 25/453; H04M 9/085
USPC .......... 381/66, 71-1, 71.11, 71.12, 71.14, 93, 381/94.1-94.9, 95, 96; 700/94; 379/406.01-406.09, 406.11-406.14; 455/266, 296, 307
See application file for complete search history.

(56) References Cited

U.S. PATENT DOCUMENTS

| | | | | |
|---|---|---|---|---|
| 8,379,894 | B2 * | 2/2013 | Klinkby | 381/318 |
| 8,396,236 | B2 * | 3/2013 | Pape et al. | 381/318 |
| 2006/0159282 | A1 | 7/2006 | Borsch | |
| 2007/0019824 | A1 | 1/2007 | Osmanovic et al. | |

FOREIGN PATENT DOCUMENTS

JP 2011024072 A * 2/2011

OTHER PUBLICATIONS

Waterschoot et al, "50 years of acoustic feedback control: state of the art & future challenges", Feb. 2009.*

Ferdjallah et al, "Adaptive digital notch filter design on the unit circle for the removal of powerline noise from biomedical signals", IEEE; Jun. 1994; pp. 529-536.*

Moonen et al; "Adaptive feedback cancellation for audio signals using a warped all-pole near end signal model", IEEE 2008; pp. 269-272.*

Mitra, "IIR Filter Structures", Jan. 18, 2007, pp. 1-33; http://www.site.uottawa.ca/~mbolic/elg6163/ELG6163_IIR.pdf.*

Rocha et al, "An accurate method of detection and cancellation of multiple acoustic feedbacks", May 28, 2005; Audio Engineering Society.*

Communication dated Apr. 29, 2013, issued by the European Patent Office in counterpart European Application No. 11155129.7.

* cited by examiner

*Primary Examiner* — Vivian Chin
*Assistant Examiner* — David Ton
(74) *Attorney, Agent, or Firm* — Sughrue Mion, PLLC

(57) ABSTRACT

A variable-bandwidth adaptive notch filter which cancels howling from an input signal with a bandwidth varying according to a howling frequency to generate an output signal.

23 Claims, 7 Drawing Sheets

ADAPTIVE NOTCH FILTER WITH VARIABLE BANDWIDTH, AND METHOD AND APPARATUS FOR CANCELING HOWLING BY USING THE ADAPTIVE NOTCH FILTER WITH VARIABLE BANDWIDTH

CROSS-REFERENCE TO RELATED PATENT APPLICATION

This application claims priority from Korean Patent Application No. 10-2010-0020064, filed on Mar. 5, 2010, in the Korean Intellectual Property Office, the disclosure of which is incorporated herein in its entirety by reference.

BACKGROUND

1. Field

Exemplary embodiments relate to a variable-bandwidth adaptive notch filter, and a method and apparatus for canceling howling by using the variable-bandwidth adaptive notch filter, and more particularly, to a variable-bandwidth adaptive notch filter which cancels howling with a bandwidth varying according to a howling frequency by using a frequency warping technique, and a method and apparatus for canceling howling by using the variable-bandwidth adaptive notch filter.

2. Description of the Related Art

Low-frequency oscillation sound, called "howling", is generated during a procedure where sound or vibration at an output side (a speaker or a receiver) is fed back to an input side and amplified at the input side and the output sound or vibration is fed back to the input side and amplified again at the input side in a public address system or a record player. When howling, which is sound generated when micro sound or vibration is fed back in a speaker, is generated, a device enters a maximum power state in an instant, thereby damaging an audio system of the device.

To cancel howling, which involves resonance and oscillation of a particular frequency, the particular frequency is found and attenuated.

In general, an equalizer is used to attenuate a particular frequency. To cancel howling by using an equalizer, a graphic equalizer is adjusted to be flat, a non-directional microphone having a flat feature is connected, and an observation is made about in which frequency band howling is generated with an increase in a gain of a system. If the frequency band where howling is generated is determined, a process of pulling down an equalizer slider of the frequency band is repeated until a sufficient sound reinforcement gain is obtained. In this way, a maximum stable gain, which prevents howling, can be obtained.

However, in this method, tone changes due to a large change of frequency characteristics. Moreover, as a frequency band, which causes howling, changes with a position of an audio system, continuous adjustment is required in association with the change. Since a howling cancellation frequency bandwidth is fixed, a speech component may also be removed together with howling in a low-frequency band where the speech component is present.

SUMMARY

Exemplary embodiments provide a variable-bandwidth adaptive notch filter, and a method and apparatus for canceling howling by using the variable-bandwidth adaptive notch filter.

According to an aspect of exemplary embodiments, there is provided a method of canceling howling, the method including canceling howling from an input signal with a bandwidth varying according to a howling frequency to generate an output signal.

In an embodiment, the canceling of howling may include canceling howling from the input signal with a harrower bandwidth for a lower howling frequency. The canceling of howling may include generating a feed-forward signal by using the input signal, generating a feed-back signal by using the output signal, and generating the output signal by adding the feed-forward signal and the feed-back signal, and the generating of the feed-forward signal may include applying a frequency warping filter on the input signal from once up to N times, in which N is a natural number greater than 2, multiplying the input signal and signals to which the frequency warping filter is applied from once up to N times by first through $(N+1)^{th}$ coefficients, respectively, and adding the coefficient-applied signals to generate the feed-forward signal, and the generating of the feed-back signal may include applying the frequency warping filter on the output signal from once up to N times, multiplying the signals to which the frequency warping filter is applied from once up to N times by $1^{'th}$ through $N^{'th}$ coefficients, respectively, and adding the coefficient-applied signals to generate the feed-back signal.

A transfer function D(z) of the frequency warping filter may be given by:

$$D(z) = \frac{z^{-1} - \lambda}{1 - \lambda z^{-1}},$$

where λ, is an adjustment parameter for warping a frequency response and is a positive real number less than or equal to 1.

If N is equal to 2, the multiplying by the first through $(N+1)^{th}$ coefficients may include multiplying the input signal and the signals to which the frequency warping filter is applied from once up to N times by 1, −a(n), and 1, respectively, the multiplying by the $1^{'th}$ through $N^{'th}$ coefficients may include multiplying the signals to which the frequency warping filter is applied from once up to N times by $a(n)\rho$ and $\rho^2$, respectively, and a(n) may be a coefficient for determining a howling frequency and ρ may be a positive real number less than or equal to 1 and may be a parameter for determining a howling cancellation frequency bandwidth.

The method may further include generating a signal $w_0$ and signals $w_1$ through $w_m$ obtained by applying a frequency warping filter to the signal $w_0$ from once up to M times as the input signal, in which M is a natural number greater than 2, and obtaining the coefficient a(n) by using Equation (5) expressed as follows:

$$a(n+1) = a(n) + \mu\frac{z(n)(x(n-1) - \rho y(n-1))}{\|(x(n-1) - \rho y(n-1))\|_2},$$

where x(n) indicates the input signal, z(n) indicates the feed-forward signal, and y(n) indicates the output signal.

The method may further include before canceling howling from the input signal with a bandwidth varying according to a howling frequency, filtering a signal in a first frequency band from a signal from which howling is to be canceled to generate the input signal.

The method may further include adding signals remaining in the signal from which howling is to be canceled except for the signal in the first frequency band to the output signal. The canceling of howling from the input signal with a different frequency bandwidth for a different howling frequency may include performing frequency warping on the input signal, canceling howling in a howling frequency of the frequency-warped signal with the same bandwidth, and performing frequency dewarping on the howling-canceled signal.

The canceling of howling with the same bandwidth may include estimating the howling frequency in the frequency-warped signal, canceling howling in the estimated howling frequency with the same bandwidth, calculating a difference between an energy of a signal prior to cancellation of howling in the estimated howling frequency and an energy of the howling-canceled signal, and outputting the howling-canceled signal if the difference exceeds a threshold value.

According to another aspect of exemplary embodiments, there is provided a variable-bandwidth adaptive notch filter which cancels howling from an input signal with a bandwidth varying according to a howling frequency to generate an output signal.

In an exemplary embodiment, the variable-bandwidth adaptive notch filter may cancel howling from the input signal with a narrower bandwidth for a lower howling frequency. The variable-bandwidth adaptive notch filter may include a feed-forward part including N frequency warping filters, (N+1) multipliers which apply a variable coefficient to the input signal and N signals which have been frequency-warped from once up to N times, and N adders which add the coefficient-applied signals, and a feed-back part including N frequency warping filters, N multipliers which apply a variable coefficient to N signals which have been frequency-warped from once up to N times, and N adders which add the coefficient-applied signals and the feed-forward signal generated by the feed-forward part, thus generating an output signal.

A transfer function D(z) of the frequency warping filter may be given by:

$$D(z) = \frac{z^{-1} - \lambda}{1 - \lambda z^{-1}},$$

where λ is an adjustment parameter for warping a frequency response and is a positive real number less than or equal to 1.

If N is equal to 2, three multipliers included in the feed-forward part may apply a coefficient of 1 to the input signal, a coefficient of −a(n) to a signal obtained by applying a frequency warping filter to the input signal once, and a coefficient of 1 to a signal obtained by applying the frequency warping filter to the input signal twice, two multipliers included in the feed-back part may apply a coefficient of a(n)ρ to a signal obtained by applying the frequency warping filter to the output signal once and a coefficient of $\rho^2$ to a signal obtained by applying the frequency warping filter to the output signal twice, and a(n) may be a coefficient for determining a howling frequency and ρ may be a positive real number less than or equal to 1 and may be a parameter for determining a howling cancellation frequency bandwidth of the variable-bandwidth adaptive notch filter.

a(n) may be given by:

$$a(n+1) = a(n) + \mu \frac{z(n)(x(n-1) - \rho y(b-1))}{\|(x(n-1) - \rho y(n-1))\|_2},$$

wherein when a signal $w_0$ and signals $w_1$ through $w_m$ obtained by applying the frequency warping filter to the signal $w_0$ from once up to M times are sequentially input to the variable-bandwidth adaptive notch filter as an input signal x(n), z(n) indicates an output signal of the feed-forward part and y(n) indicates an output signal of the variable-bandwidth adaptive notch filter in which M is a natural number greater than 2.

According to still another aspect of exemplary embodiments, there is provided an apparatus for canceling howling including a variable-bandwidth adaptive notch filtering unit which cancels howling from an input signal with a bandwidth varying according to a howling frequency to generate an output signal.

According to yet another aspect of exemplary embodiments, there is provided a computer-readable recording medium having recorded thereon a program for executing a method of canceling howling, the method including canceling howling from an input signal with a bandwidth varying according to a howling frequency to generate an output signal.

According to exemplary embodiments, a variable-bandwidth adaptive notch filter for canceling howling by using a frequency warping technique, and a method and apparatus for canceling howling by using the variable-bandwidth adaptive notch filter can be provided.

Moreover, a variable-bandwidth adaptive notch filter capable of efficiently canceling howling with a small amount of computation, and a method and apparatus for canceling howling by using the variable-bandwidth adaptive notch filter can be provided.

BRIEF DESCRIPTION OF THE DRAWINGS

The above and other features and advantages of the present disclosure will become more apparent by describing in detail exemplary embodiments thereof with reference to the attached drawings in which.

DETAILED DESCRIPTION

Hereinafter, exemplary embodiments will be described in detail with reference to the accompanying drawings.

Figure 1:
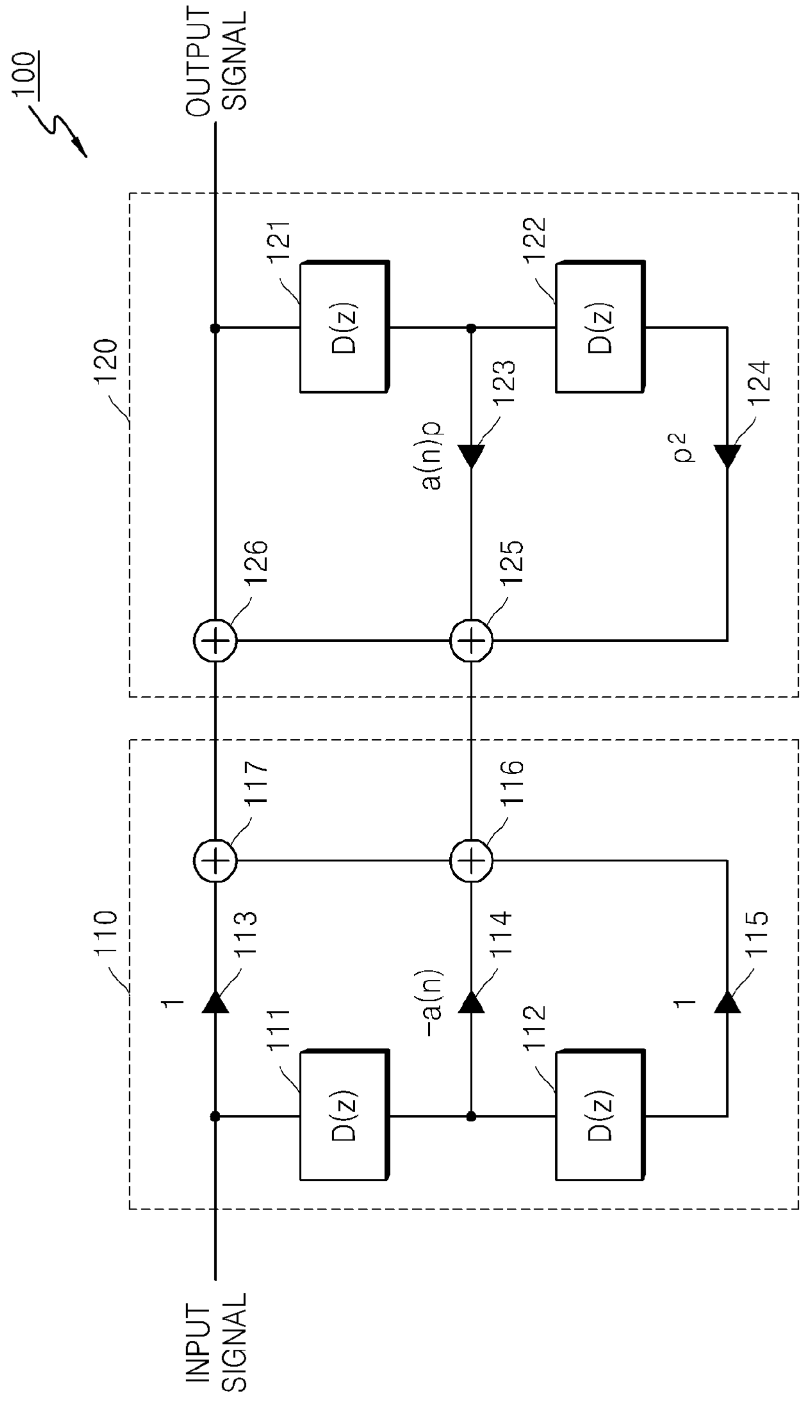
FIG. 1 is a diagram showing a structure of a variable-bandwidth adaptive notch filter according to an exemplary embodiment.

FIG. 1 is a diagram showing a structure of a variable-bandwidth adaptive notch filter 100 according to an exemplary embodiment. The variable-bandwidth adaptive notch filter 100 is an adaptive notch filter which detects a frequency suspected to be a howling frequency and cancels the detected frequency.

A notch filter generally cancels a particular howling frequency because a coefficient is fixed to a specific frequency. In an adaptive notch filter, however, a coefficient is a variable, rather than a constant, and thus the coefficient continuously adapts to and changes with an input signal. Since a howling frequency continuously changes in an input signal, the adaptive notch filter detects the howling frequency and cancels howling in the detected howling frequency.

The variable-bandwidth adaptive notch filter 100 according to the present embodiment cancels howling with a frequency bandwidth varying according to a howling frequency and generates an output signal. That is, the variable-bandwidth adaptive notch filter 100 cancels howling with a narrow bandwidth for a low howling frequency and with a broad bandwidth for a high howling frequency.

An amp gain that can be raised to a maximum without causing howling is called a maximum stable gain. Generally, howling is canceled well with a howling canceling filter having a large bandwidth, which increases a maximum stable gain; whereas howling is not sufficiently canceled with a howling canceling filter having a small bandwidth, which decreases a maximum stable gain.

The human voice has a low-frequency component ranging between about 340 Hz and 3.4 KHz. Therefore, like in a frequency band where voice is not present, in a low-frequency band where voice is present, when howling is canceled by a large bandwidth of an adaptive notch filter to increase a maximum stable gain, a voice component is also removed, thereby causing voice distortion.

Accordingly, the present invention proposes a variable-bandwidth adaptive notch filter which can prevent voice distortion by canceling howling in a low-frequency band where voice is present with a narrower bandwidth than in a high-frequency band where voice is not present, and can increase a maximum stable gain by canceling howling in the high-frequency band with a broader bandwidth than that of the low-frequency band.

Referring to FIG. 1, the variable-bandwidth adaptive notch filter 100 according to the present embodiment includes a feed-forward part 110 and a feed-back part 120. The feed-forward part 110 includes a first frequency warping filter 111, a second frequency warping filter 112, a first multiplier 113, a second multiplier 114, a third multiplier 115, a first adder 116, and a second adder 117. The feed-back part 120 includes a third frequency warping filter 121, a fourth frequency warping filter 122, a fourth multiplier 123, a fifth multiplier 124, a third adder 125, and a fourth adder 126.

In the feed-forward part 110, the first frequency warping filter 111 performs frequency warping on an input signal once to warp a frequency resolution of the input signal. The second frequency warping filter 112 performs frequency warping for the second time on the input signal which has been frequency-warped by the first frequency warping filter 111.

The first multiplier 113 multiplies the input signal by a coefficient of 1. The second multiplier 114 multiplies the input signal which has been frequency-warped by the first frequency warping filter 111 by a variable coefficient of −a(n). A variable coefficient of a(n) may be obtained by using a frequency warping filter 200 shown in FIG. 2. That is, a designer or a designing apparatus for the variable-bandwidth adaptive notch filter 100 may obtain the variable coefficient a(n) of the variable-bandwidth adaptive notch filter 100 shown in FIG. 1 by using the frequency warping filter 200 shown in FIG. 2, and design the variable-bandwidth adaptive notch filter 100 by using the variable coefficient a(n). A method of obtaining the variable coefficient a(n) will be described later in more detail with reference to FIG. 2.

The third multiplier 115 multiplies the input signal, which has been frequency-warped for the second time, by the coefficient 1.

The first adder 116 adds the signal coefficient-multiplied by the second multiplier 114 and the signal coefficient-multiplied by the third multiplier 115. The second adder 117 adds the input signal multiplied by the coefficient 1 and the signal output from the first adder 116, thus generating an output signal of the feed-forward part 110. The output signal of the feed-forward part 110 will be referred to as a feed-forward signal.

In the feed-back part 120, the third frequency warping filter 121 performs frequency warping once on an output signal of the variable-bandwidth adaptive notch filter 100. The fourth frequency warping filter 122 performs frequency warping for the second time on the output signal which has been frequency-warped by the third frequency warping filter 121.

The fourth multiplier 123 multiplies the output signal which has been frequency-warped by the third frequency warping filter 121 by a variable coefficient of a(n)ρ. The value ρ is a positive real number less than or equal to 1, and is a parameter for determining a howling cancellation frequency bandwidth of the variable-bandwidth adaptive notch filter 100.

The howling cancellation frequency bandwidth of the variable-bandwidth adaptive notch filter 100 is obtained by using ρ and a maximum frequency pi. That is, the howling cancellation frequency bandwidth may be given by B=pi*(1-ρ). Herein, B indicates the howling cancellation frequency bandwidth, pi indicates the highest frequency. For example, for a sampling frequency of 16000 Hz, pi is 8000 Hz.

The value ρ may be given by a designer or a designing apparatus for the variable-bandwidth adaptive notch filter 100. The variable-bandwidth adaptive notch filter 100 determines a howling cancellation frequency bandwidth by using the given value ρ and cancels howling with the determined howling cancellation frequency bandwidth. In the variable-bandwidth adaptive notch filter 100, the value ρ is mapped to a value greater than the original value ρ in a low-frequency band and is mapped to a value less than the original value ρ in a high-frequency band. Accordingly, a value (1-ρ) decreases in the low-frequency band, thereby reducing the howling cancellation frequency bandwidth of the variable-bandwidth adaptive notch filter 100 in the low-frequency band; whereas the value (1-ρ) increases in the high-frequency band, thereby increasing the howling cancellation frequency bandwidth of the variable-bandwidth adaptive notch filter 100 in the high-frequency band.

The fifth multiplier 124 multiplies the output signal, which has been frequency-warped for the second time by the fourth frequency warping filter 122, by a coefficient of $\rho^2$.

The third adder 125 adds the signal coefficient-multiplied by the fourth multiplier 123 and the signal coefficient-multiplied by the fifth multiplier 124, generating a feed-back signal. The fourth adder 126 adds the feed-back signal generated by the third adder 125 to the feed-forward signal, thus generating an output signal of the variable-bandwidth adaptive notch filter 100.

Although an adaptive notch filter in a second-order infinite impulse response (IIR) form, which is the most efficient in terms of the amount of computations, has been used as the variable-bandwidth adaptive notch filter 100 in FIG. 1, the present disclosure is not limited to the above example and an HR adaptive notch filter of an order other than the second order may be used.

If an order is an $N^{th}$ order, the feed-forward part 110 of the variable-bandwidth adaptive notch filter 100 includes N frequency warping filters, (N+1) multipliers, and N adders, and the feed-back part 120 includes N frequency warping filters, N multipliers, and N adders.

In case of the $N^{th}$ order, in the feed-forward part 110, the N frequency warping filters perform frequency warping from once up to N times on an input signal to warp the input signal. The (N+1) multipliers included in the feed-forward part 110 apply a variable coefficient to the input signal and N signals which have been frequency-warped from once up to N times, and the N adders add the coefficient-applied signals to generate a feed-forward signal.

In the feed-back part 120, the N frequency warping filters perform frequency warping from once up to N times on an output signal to warp the output signal. The N multipliers apply a variable coefficient to N signals which have been frequency-warped from once up to N times, and the N adders add the coefficient-applied signals and the feed-forward signal generated by the feed-forward part 110, thus generating an output signal of the variable-bandwidth adaptive notch filter 100.

Although the variable-bandwidth adaptive notch filter 100 is designed as an IIR filter in a direct form II in FIG. 1, the present invention is not limited to the above example and the variable-bandwidth adaptive notch filter 100 may also be designed as an IIR filter in a direct form I having the same transfer function as an IIR filter in the direct form II. When the variable-bandwidth adaptive notch filter 100 is designed as an IIR filter in the direct form I, the number of frequency warping filters included in the HR filter is half the number of frequency warping filters included in an IIR filter in the direct form II. That is, for the $N^{th}$ order, an IIR filter in the direct form II includes a total of 2N frequency warping filters, whereas an IIR filter in the direct form I includes a total of N frequency warping filters.

As such, according to an embodiment of the present invention, it is possible to provide a variable-bandwidth adaptive notch filter that generates an output signal by canceling howling with a howling cancellation frequency bandwidth varying according to a howling frequency of an input signal.

Figure 2:
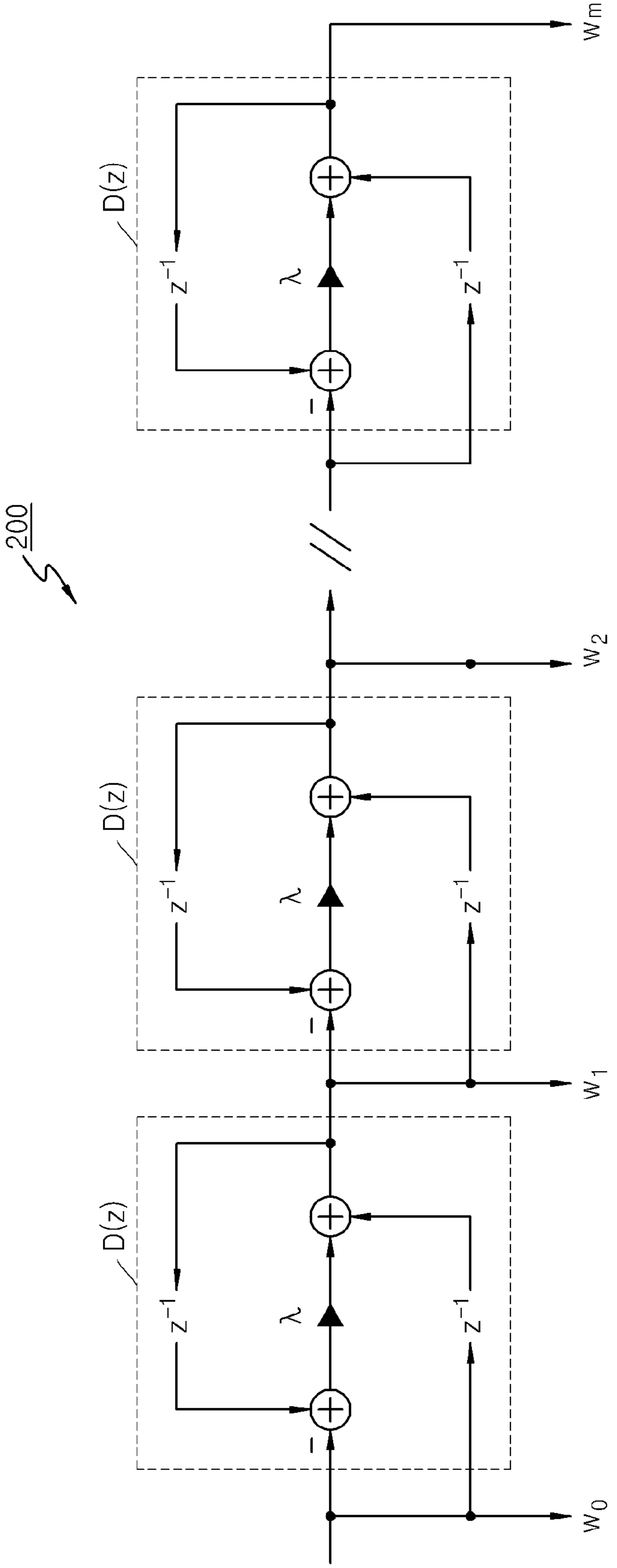
FIG. 2 is a diagram showing a structure of a frequency warping filter according to an exemplary embodiment.

FIG. 2 is a diagram showing a structure of the frequency warping filter 200 according to an exemplary embodiment. To achieve conflicting targets of high sound quality and high maximum stability at the same time, a howling cancellation frequency bandwidth of an adaptive notch filter has to be narrow in a low-frequency band where voice is present and has to be broad in a high-frequency band where voice is not present. As such, to give a variable-bandwidth feature to the adaptive notch filter, a frequency warping technique is used in the present disclosure. The frequency warping technique applies different resolutions to different frequencies, and may be implemented by using a frequency warping filter.

FIG. 2 shows the structure of the frequency warping filter 200 which may be implemented as a first-order all-pass filter. A transfer function D(z) of the frequency warping filter 200 may be expressed as follows:

$$D(z) = \frac{z^{-1} - \lambda}{1 - \lambda z^{-1}}, \tag{1}$$

where λ is an adjustment parameter for warping a frequency response and is a real number less than or equal to 1 and greater than or equal to −1. As λ being a positive real number increases, that is, λ approaches 1, a resolution of a low frequency increases; whereas as λ being a negative real number decreases, that is, λ approaches −1, a resolution of a high frequency increases.

Since the human voice has a low-frequency component ranging between about 340 Hz and 3.4 KHz as stated above, it is desirable to cancel howling with a narrower bandwidth in a low-frequency band where voice is present than in a high-frequency band. Therefore, in an exemplary embodiment, λ is a positive real number less than or equal to 1.

The variable coefficient a(n) of the variable-bandwidth adaptive notch filter 100 shown in FIG. 1 is obtained by using the frequency warping filter 200 shown in FIG. 2. In other words, a designer or a designing apparatus for the variable-bandwidth adaptive notch filter 100 obtains the variable coefficient a(n) by using the frequency warping filter 200 and designs the variable-bandwidth adaptive notch filter 100 by using the variable coefficient a(n). Hereinafter, a method of obtaining the variable coefficient a(n) will be described below.

In FIG. 2, it is assumed that a signal $w_0$ is input to and passes through a first frequency warping filter and thus is output as a signal $w_1$, the signal $w_1$ is input to and passes through a second frequency warping filter and thus is output as a signal $w_2$, and a signal $w_{(m-1)}$ is input to and passes through an $M^{th}$ (M is a natural number) frequency warping filter and thus is output as a signal $w_m$. The signal $w_0$, which is input to the first frequency warping filter, through the signal $w_m$, which is generated after frequency warping M times, that is, the signals $w_0, w_1, w_2, \ldots w_m$ are sequentially input to the variable-bandwidth adaptive notch filter 100 in that order as an input signal x(n). In this case, feed-forward signals z(n) are sequentially output from the feed-forward part 110 of the variable-bandwidth adaptive notch filter 100 and output signals y(n) are sequentially generated from the feed-back part 120 of the variable-bandwidth adaptive notch filter 100. By using a steepest descent-based algorithm, the variable coefficient a(n) is given by:

$$a(n+1) = a(n) + \mu\frac{z(n)(x(n-1) - \rho y(n-1))}{\|(x(n-1) - \rho y(n-1))\|_2}, \tag{2}$$

where n represents time and ρ represents a parameter for determining a howling cancellation frequency bandwidth of an adaptive notch filter.

From the variable coefficient a(n), a center frequency where howling is generated can be obtained by using:

$$\cos(a(n)/2) \tag{3}$$

A designer or a designing apparatus for the variable-bandwidth adaptive notch filter 100 may implement the variable-bandwidth adaptive notch filter 100 by applying the variable coefficient a(n) obtained from Equation (2) to the variable-bandwidth adaptive notch filter 100 of FIG. 1.

Since the variable coefficient a(n) has been generated by using a signal generated using the frequency warping filter 200, that is, a frequency-warped signal, the variable-bandwidth adaptive notch filter 100 to which the variable coefficient a(n) is applied can process a frequency-warped signal.

In this way, according to an exemplary embodiment, by designing the variable-bandwidth adaptive notch filter 100 with the variable coefficient a(n) obtained by using the frequency warping filter 200, adaptive notch filtering can be performed with a narrow bandwidth in a low-frequency band and with a broad bandwidth in a high-frequency band.

Figure 3:
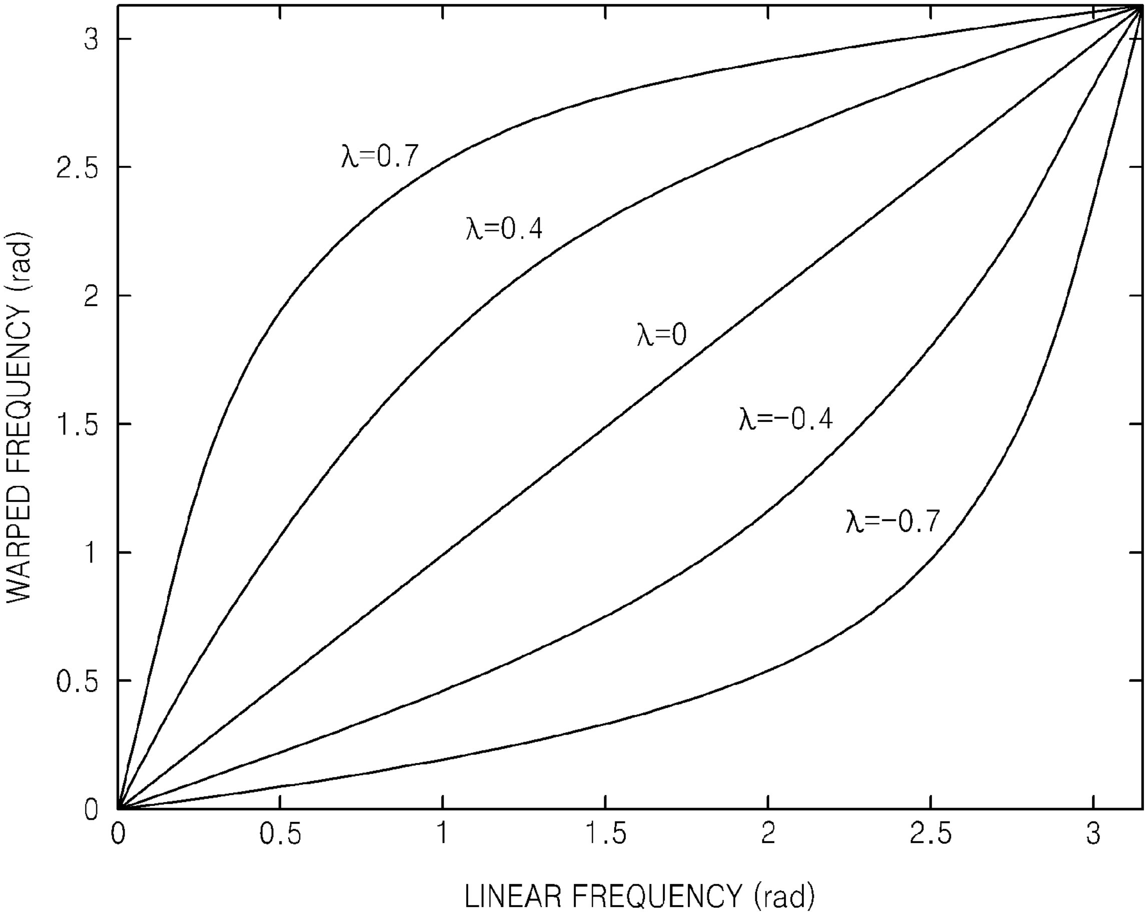
FIG. 3 is a graph illustrating frequency characteristics of the frequency warping filter shown in FIG. 2.

FIG. 3 is a graph illustrating frequency characteristics of the frequency warping filter 200 shown in FIG. 2. In the graph shown in FIG. 3, both a horizontal axis and a vertical axis indicate a linear frequency and a warped frequency, respectively, in units of radians. In the graph of FIG. 3, warped frequency generated when linear frequency is input to the frequency warping filter 200 is plotted.

It can be seen from the graph of FIG. 3 that the degree of warping of a frequency resolution varies with the adjustment parameter λ for warping a frequency response. That is, as λ being a positive real number increases, that is, λ approaches 1, the degree of warping of a low frequency increases; whereas as λ being a negative real number decreases, that is, λ approaches −1, the degree of warping of a high frequency increases. As stated above, in an exemplary embodiment, λ is preferably a positive real number. When λ being a positive real number increases, the degree of warping of a low frequency increases, which means that a resolution of the low frequency increases. The increase in the resolution of the low frequency means that a low-frequency signal increases when compared to a high-frequency signal.

Figure 4:
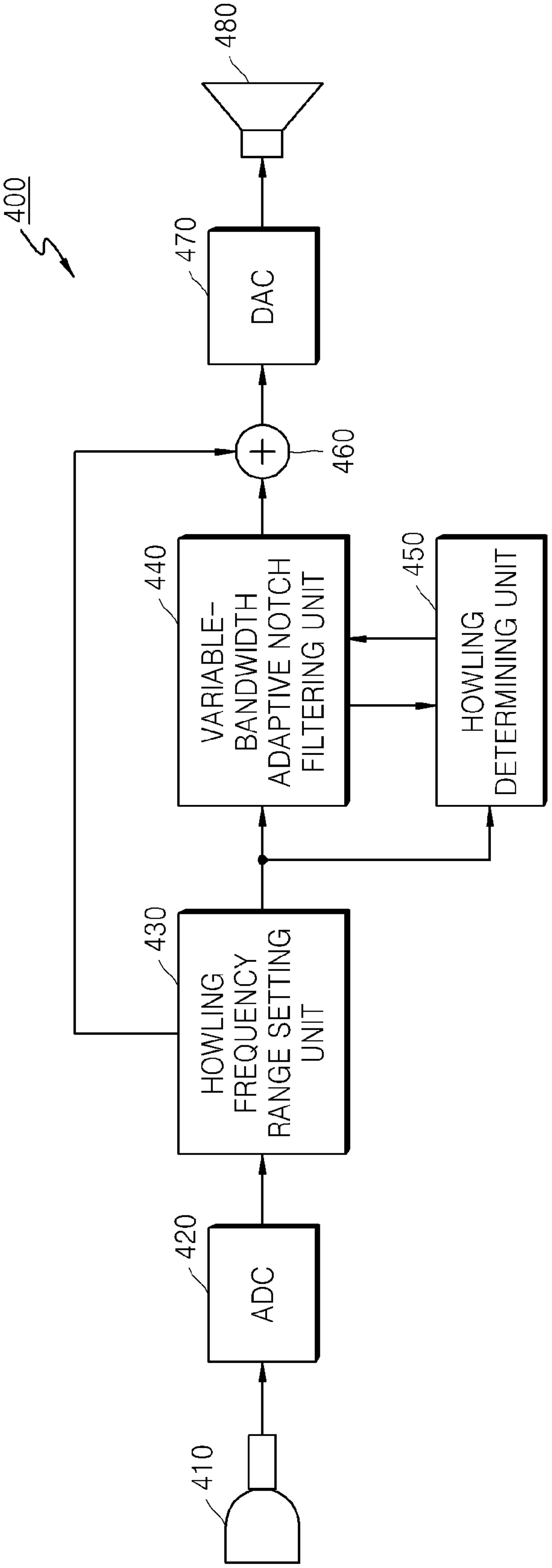
FIG. 4 is a block diagram of an apparatus for canceling howling according to an exemplary embodiment.

FIG. 4 is a block diagram of a howling canceling apparatus 400 according to an exemplary embodiment. Referring to FIG. 4, the howling canceling apparatus 400 includes an input unit 410, an analog-to-digital converter (ADC) 420, a howling frequency range setting unit 430, a variable-bandwidth adaptive notch filtering unit 440, a howling determining unit 450, an adder 460, a digital-to-analog converter (DAC) 470, and an output unit 480.

The input unit 410 has input thereto a signal for canceling howling and outputs the signal to the ADC 420. The ADC 420 converts an analog signal to a digital signal and outputs the digital signal to the howling frequency range setting unit 430.

The howling frequency range setting unit 430 extracts a signal in a predetermined frequency band from a signal from which howling is to be canceled.

Generally, howling is not generated in a band below 100 Hz and in a band over 8 KHz. Accordingly, it is efficient to cut off signals in a frequency band where howling is not generated, that is a signal below 100 Hz and a signal over 8 KHz, prior to howling estimation. To this end, in an exemplary embodiment, the howling frequency range setting unit 430 extracts a signal in a frequency band where howling is probable, that is, a signal in a band of 100 Hz to 8 KHz. When the frequency band where howling is likely to be generated is a first frequency band, the howling frequency range setting unit 430 may be implemented as a band pass filter (BPF) which passes only a first-frequency-band signal.

The howling frequency range setting unit 430 outputs the extracted first-frequency-band signal to the variable-bandwidth adaptive notch filtering unit 440 and the howling determining unit 450.

The variable-bandwidth adaptive notch filtering unit 440 estimates howling in the first-frequency-band signal and also cancels howling in an estimated howling frequency. In an exemplary embodiment, the variable-bandwidth adaptive notch filtering unit 440 cancels howling with a varying bandwidth according to a howling frequency. The variable-bandwidth adaptive notch filtering unit 440 cancels howling with a narrow bandwidth for a low howling frequency and with a broad bandwidth for a high howling frequency from the first-frequency-band signal.

To this end, the variable-bandwidth adaptive notch filtering unit 440 may perform frequency warping on the first-frequency-band signal. When the variable-bandwidth adaptive notch filtering unit 440 performs frequency warping on the first-frequency-band signal by using the frequency warping filter 200 shown in FIG. 2, a resolution of the first-frequency-band signal may be warped according to frequency. If the value is a positive real number less than or equal to 1, a low-frequency signal increases and a high-frequency signal decreases.

The variable-bandwidth adaptive notch filtering unit 440 may estimate a howling frequency in a signal of which a frequency resolution is warped and cancel estimated howling with the same bandwidth. The variable-bandwidth adaptive notch filtering unit 440 may dewarp the signal from which howling has been canceled such that the signal can have the original frequency resolution. Since howling has been canceled with the same bandwidth both in a low-frequency band and in a high-frequency band when a low-frequency signal increases, a howling-canceled bandwidth in the low-frequency band is smaller than that in the high-frequency band if the frequency resolution of the signal is changed to the original resolution.

The variable-bandwidth adaptive notch filtering unit 440 may be implemented with the variable-bandwidth adaptive notch filter 100 shown in FIG. 1. In this case, the variable-bandwidth adaptive notch filtering unit 440 may include the feed-forward part 110 which generates the feed-forward signal and the feed-back part 120 which generates the output signal, as shown in FIG. 1.

The variable-bandwidth adaptive notch filtering unit 440 may be implemented as a second-order IIR filter, like the variable-bandwidth adaptive notch filter 100 shown in FIG. 1, but the present invention is not limited to the above example and the variable-bandwidth adaptive notch filtering unit 440 may also be implemented as an $N^{th}$-order IIR filter. In this case, the variable-bandwidth adaptive notch filtering unit 440 may include a feed-forward part and a feed-back part. The feed-forward part includes N frequency warping filters, (N+1) multipliers which apply a variable coefficient to the first-frequency-band signal and N signals which have been frequency-warped from once up to N times, and N adders which sums the coefficient-applied signals. The feed-back part includes N frequency warping filters, N multipliers which apply a variable coefficient to N signals which have been frequency-warped from once up to N times, and N adders which add the coefficient-applied signals and the feed-forward signal generated by the feed-forward part, thus generating the output signal.

When the variable-bandwidth adaptive notch filtering unit 440 is implemented with the variable-bandwidth adaptive notch filter 100 shown in FIG. 1, the variable coefficient a(n) of the variable-bandwidth adaptive notch filter 100 shown in FIG. 1 may be obtained by using the frequency warping filter 200 shown in FIG. 2.

The variable-bandwidth adaptive notch filtering unit 440 stores both the first-frequency-band signal and the signal from which howling is canceled, and outputs the howling-canceled signal or the original signal prior to howling cancellation, that is, the first-frequency-band signal, to the adder 460, under the control of the howling determining unit 450.

The howling determining unit 450 has input thereto the first-frequency-band signal from the howling frequency range setting unit 430. The howling determining unit 450 may have input thereto the howling-canceled signal from the variable-bandwidth adaptive notch filtering unit 440. The howling determining unit 450 compares the energy of the first-frequency-band signal received from the howling frequency range setting unit 430 with the energy of the howling-canceled signal received from the variable-bandwidth adaptive notch filtering unit 440.

If the first-frequency-band signal includes howling, the howling is canceled by the variable-bandwidth adaptive notch filtering unit 440 and thus the energy of the howling-canceled signal becomes smaller than that of the first-frequency-band signal.

If a difference between the energy of the first-frequency-band signal received from the howling frequency range setting unit 430 and the energy of the howling-canceled signal received from the variable-bandwidth adaptive notch filtering unit 440 is greater than a threshold value, the howling determining unit 450 determines that howling is generated and controls the variable-bandwidth adaptive notch filtering unit 440 such that the howling-canceled signal is input to the adder 460.

Otherwise, if the difference is not greater than the threshold value, the howling determining unit 450 determines that howling is not generated and controls the variable-bandwidth adaptive notch filtering unit 440 such that the original signal prior to howling cancellation, that is, the first-frequency-band signal is input to the adder 460.

The adder 460 adds a signal which has not been filtered by the howling frequency range setting unit 430, that is, a signal which is not included in the first frequency band, to the output signal of the variable-bandwidth adaptive notch filtering unit 440.

The DAC 470 converts a signal generated by the adder 460 into an analog signal and the output unit 480 outputs the analog signal through a speaker or the like.

In this way, according to an embodiment of the present invention, the howling canceling apparatus 400 first extracts the first-frequency-band signal from a howling cancellation target signal, and then cancels howling from the extracted first-frequency-band signal, thereby improving the efficiency of signal processing.

Moreover, according to an exemplary embodiment, the howling canceling apparatus 400 cancels howling with a howling cancellation frequency bandwidth varying according to a howling frequency, thereby obtaining high maximum stable gain without distorting a voice signal.

Figure 5:
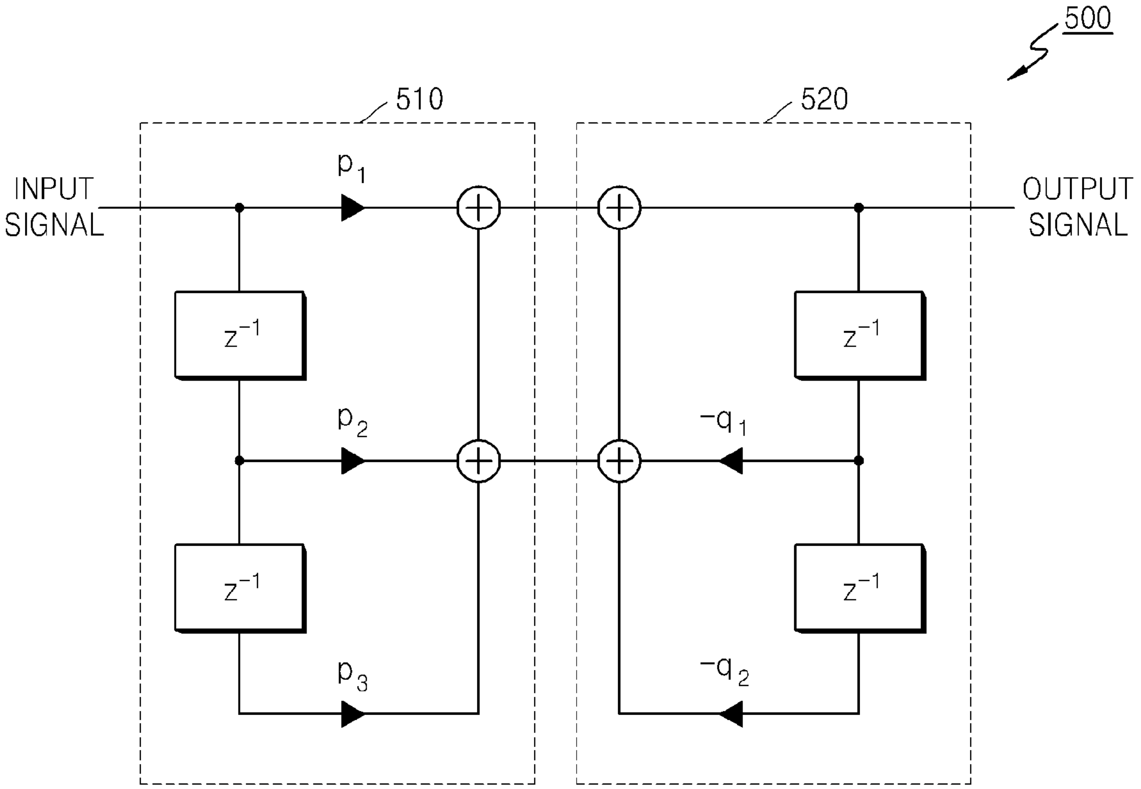
FIG. 5 is a diagram of a howling frequency range setting unit of FIG. 4, according to an exemplary embodiment.

FIG. 5 is a diagram showing an example of the howling frequency range setting unit 430 of FIG. 4 as indicated by 500, according to an exemplary embodiment. As stated previously, the howling frequency range setting unit 430 cancels signals where howling is not generated, by filtering only a signal in the first frequency band where howling may be generated.

In FIG. 5, an IIR filter in the form of a second-order BPF is shown as a howling frequency range setting unit 500. The second-order IIR filter shown in FIG. 5 is an IIR filter in the direct form II including a feed-forward part 510 and a feed-back part 520. However, the present invention is not limited to the above example, and the howling frequency range setting unit 500 may also be implemented as an IIR filter in the direct form I or a filter of an order other than the second order.

In the filter shown in FIG. 5, the feed-forward part 510 includes two delay devices, three multipliers, and two adders and the feed-back part 520 includes two delay devices, two multipliers, and two adders. Coefficients p1, p2, p3, q1, and q2 of the delay devices included in the second-order IIR filter shown in FIG. 5 are all constants and are designed to extract only the first-frequency-band signal. In an exemplary embodiment, if the first frequency band is between 100 Hz and 8 KHz, the coefficients p1, p2, p3, q1, and q2 of the delay devices may be designed to have low-band and high-band cutoff frequencies of 100 Hz and 8 KHz.

The feed-forward part 510 configures an input vector having elements delayed from an input signal received from the ADC 420 one-by-one by the number of taps of the BPF and obtains an inner product between the input vector and a vector having elements of p1, p2, and p3, thus generating a feed-forward signal. The feed-back part 520 configures an output vector having elements delayed from an output signal passing through the BPF one-by-one by the number of taps of the BPF and obtains an inner product between the output vector and a vector having elements of 1, −q1, and −q2, thus generating a feed-back signal. The feed-back part 520 adds the feed-forward signal and the feed-back signal, thereby obtaining an output signal of the BPF.

In this way, according to an embodiment of the present invention, the howling frequency range setting unit 500 may be implemented as a second-order IIR filter.

Figure 6:
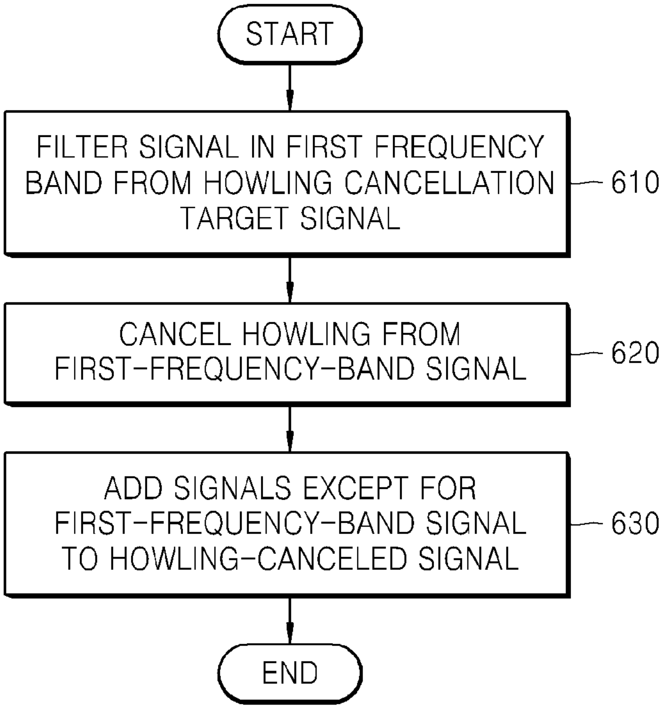
FIG. 6 is a flowchart of a method of canceling howling, according to an exemplary embodiment.

FIG. 6 is a flowchart of a method of canceling howling, according to an exemplary embodiment. Referring to FIG. 6, the howling canceling apparatus 400 filters a signal in a first frequency band from a howling cancellation target signal, in operation 610. Generally, howling is not generated in a band over 8 KHz and in a band below 100 Hz, and thus the first frequency band may be a frequency band where howling is likely to be generated, that is, a band between 100 Hz and 8 KHz.

The howling canceling apparatus 400 cancels howling from the first-frequency-band signal, in operation 620.

The howling canceling apparatus 400 adds signals in frequency bands other than the first frequency band, that is, a signal in a frequency band over 8 KHz and a signal in a frequency band below 100 Hz, in the howling cancellation target signal, to the howling-canceled signal, in operation 630.

As such, according to an exemplary embodiment, by extracting a signal in a frequency band where howling is likely to be generated and canceling howling from the extracted signal, the efficiency of signal processing can be improved.

Figure 7:
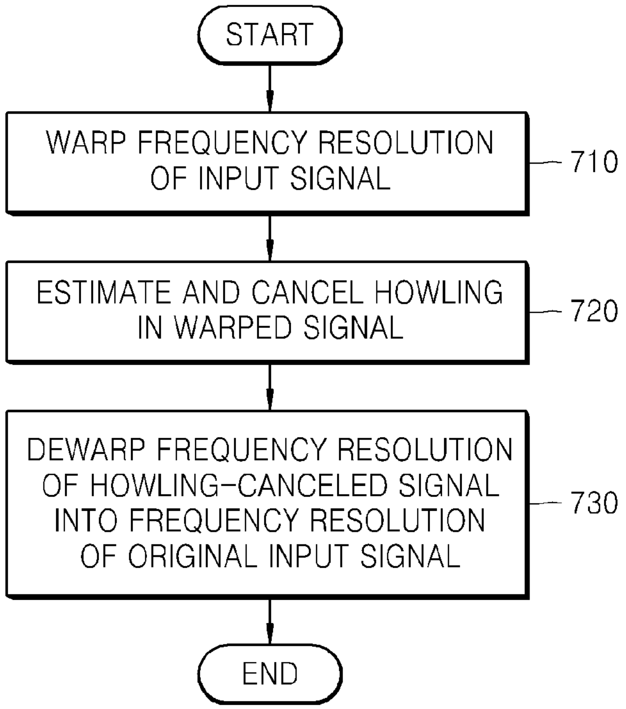
FIG. 7 is a flowchart of a method of canceling howling, according to another exemplary embodiment.

FIG. 7 is a flowchart of a method of canceling howling, according to another exemplary embodiment. Referring to FIG. 7, the howling canceling apparatus 400 warps a frequency resolution of an input signal, in operation 710. The howling canceling apparatus 400 may adjust the frequency resolution of the input signal such that a low-frequency signal increases and a high-frequency signal decreases. The howling canceling apparatus 400 estimates howling with the same bandwidth in the warped signal and cancels the howling, in operation 720.

The howling canceling apparatus 400 dewarps a frequency resolution of the howling-canceled signal into the frequency resolution of the original input signal, in operation 730. Since howling is canceled with the same bandwidth when the input signal is warped, a howling-canceled bandwidth in a low-frequency band is smaller than that in a high-frequency band in the original signal which is not warped.

In this way, according to an exemplary embodiment, howling can be canceled with a howling cancellation frequency bandwidth varying according to a howling frequency.

Figure 8:
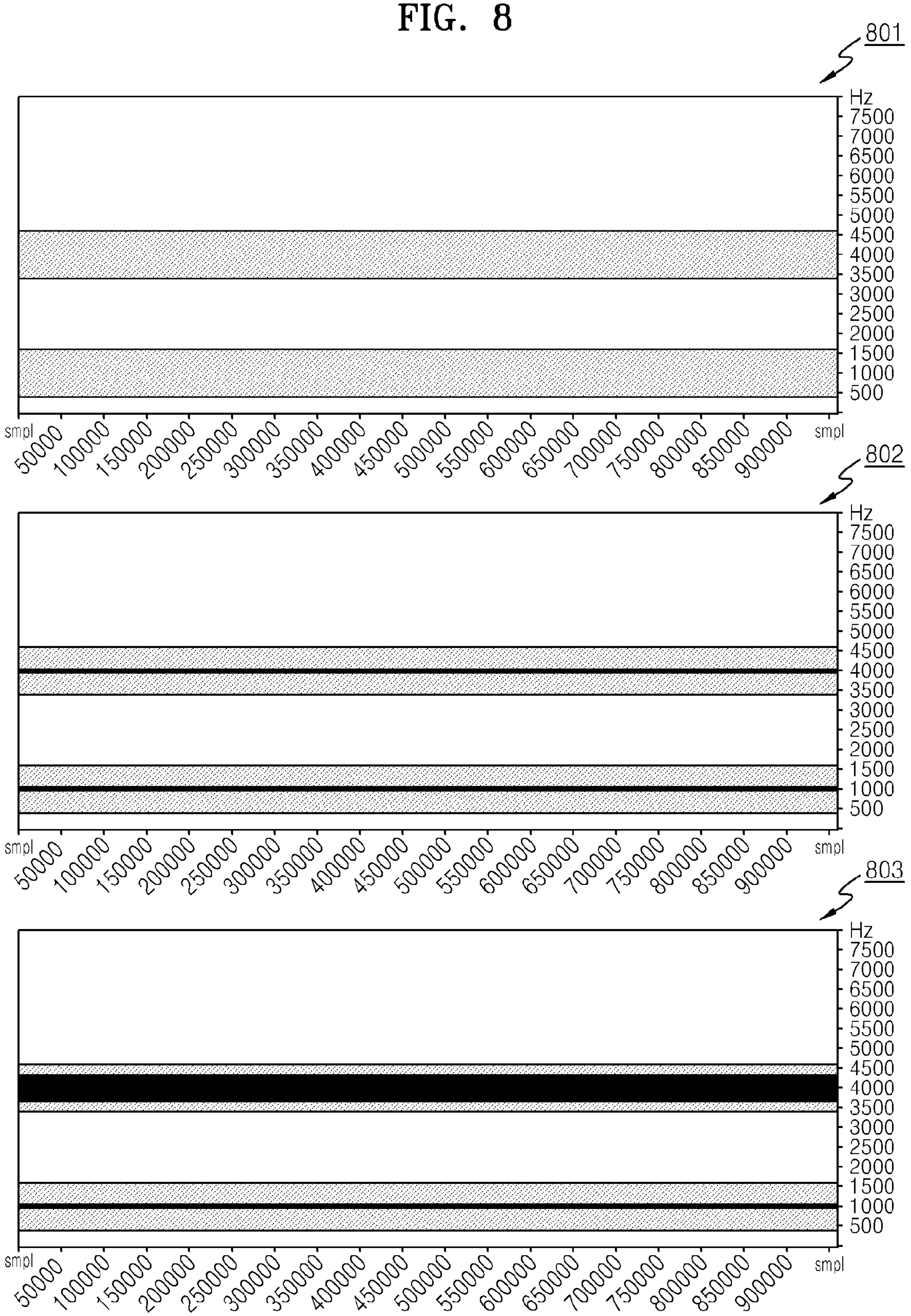
FIG. 8 shows spectrograms of signals from which howling is canceled by the variable-bandwidth adaptive notch filter shown in FIG. 1.

FIG. 8 shows spectrograms 801, 802, and 803 of signals from which howling is canceled by the variable-bandwidth adaptive notch filter 100 shown in FIG. 1. In the spectrograms 801, 802, and 803 shown in FIG. 8, a horizontal axis indicates time the number of samples and a vertical axis indicates frequency such that an energy difference according to the time axis and the frequency axis is expressed with density.

In FIG. 8, the spectrogram 801 is associated with an input signal input to the variable-bandwidth adaptive notch filter 100 shown in FIG. 1. The input signal includes a first signal having a frequency band of 500 Hz to 1.5 KHz and a second signal having a frequency band of 3.5 KHz to 4.5 KHz. The spectrogram 802 is associated with an output signal after howling is canceled from the input signal by using a general method. In the spectrogram 802, the first signal and the second signal contain black lines along their centers, meaning that signals in frequency bands marked with the black lines are canceled from the first signal and the second signal. It can be seen that the thicknesses of the black lines in the first signal and the second signal are the same, meaning that howling is canceled with the same howling cancellation frequency bandwidth from the first signal and the second signal.

The spectrogram 803 is associated with an output signal after howling is canceled from the input signal by using the variable-bandwidth adaptive notch filter 100 shown in FIG. 1. Referring to the spectrogram 803, it can be seen that the thicknesses of the black lines included in the first signal and the second signal are different from each other and the thickness of the black line of the first signal is smaller than that of the second signal, meaning that the howling-canceled bandwidth of the first signal is smaller than that of the second signal.

As such, in an exemplary embodiment, a howling cancellation frequency bandwidth varies with a howling frequency.

The method and apparatus for canceling howling according to the present invention may be embodied as a computer-readable code on a computer-readable recording medium. The recording medium may be all kinds of recording devices storing data that is readable by a computer. Examples of the recording medium include read-only memory (ROM), random access memory (RAM), CD-ROMs, magnetic tapes, floppy disks, and optical data storage devices. The computer-readable recording medium can also be distributed over a network of coupled computer systems so that the computer-readable code is stored and executed in a decentralized fashion. A function program, code, and code segments for executing the text output method can be easily construed by programmers of ordinary skill in the art.

While the present invention has been particularly shown and described with reference to exemplary embodiments thereof, it will be understood by those of ordinary skill in the art that various changes in form and details may be made therein without departing from the spirit and scope of the present invention as defined by the following claims. Accordingly, the disclosed embodiments should be considered in an illustrative sense not in a limiting sense. The scope of the present invention is defined not by the detailed description of the present invention but by the appended claims, and all differences within the scope will be construed as being included in the present invention.

What is claimed is:

1. A method of canceling howling, the method comprising canceling howling from an input signal with a bandwidth varying according to a howling frequency to generate an output signal, wherein the cancelling of howling comprises cancelling howling from the input signal with a variable-bandwidth adaptive notch filter, wherein the variable-bandwidth adaptive notch filter operates in a narrow bandwidth when the howling frequency occurs in a low frequency spectrum, and operates in a broad bandwidth when the howling frequency occurs in a high frequency spectrum.

2. The method of claim 1, wherein the canceling of howling comprises:

generating a feed-forward signal by using the input signal;

generating a feed-back signal by using the output signal; and generating the output signal by adding the feed-forward signal and the feed-back signal, wherein the generating of the feed-forward signal comprises:

applying a frequency warping filter on the input signal from once up to N times, in which N is a natural number greater than 2;

multiplying the input signal and signals to which the frequency warping filter is applied from once up to N times by first through (N+1)th coefficients, respectively; and adding the coefficient-applied signals to generate the feed-forward signal, and wherein the generating of the feed-back signal comprises:

applying the frequency warping filter on the output signal from once up to N times;

multiplying the signals to which the frequency warping filter is applied from once up to N times by $1^{st}$ through N'th coefficients, respectively; and adding the coefficient-applied signals to generate the feed-back signal.

3. The method of claim 2, wherein a transfer function D(z) of the frequency warping filter is given by:

$$D(z) = \frac{z^{-1} - \lambda}{1 - \lambda z^{-1}},$$

where λ is an adjustment parameter for warping a frequency response and is a positive real number less than or equal to 1.

4. The method of claim 3, wherein if N is equal to 2, the multiplying by the first through $(N+1)^{th}$ coefficients comprises multiplying the input signal and the signals to which the frequency warping filter is applied from once up to N times by 1, −a(n), and 1, respectively, the multiplying by the $1^{st}$ through $N'^{th}$ coefficients comprises multiplying the signals to which the frequency warping filter is applied from once up to N times by a(n)ρ and $\rho^2$, respectively, and a(n) is a coefficient for determining a howling frequency and ρ is a positive real number less than or equal to 1 and is a parameter for determining a howling cancellation frequency bandwidth.

5. The method of claim 4, further comprising:

generating a signal $w_1$ and signals $w_1$ through $w_m$ obtained by applying a frequency warping filter to the signal $w_0$ from once up to M times as the input signal, in which M is a natural number greater than 2; and obtaining the coefficient a(n) by using an equation as follows:

$$a(n+1) = a(n) + \mu \frac{z(n)(x(n-1) - \rho y(n-1))}{\|(x(n-1) - \rho y(n-1))\|_2},$$

where x(n) indicates the input signal, z(n) indicates the feed-forward signal, and y(n) indicates the output signal.

6. The method of claim 1, further comprising, before canceling howling from the input signal with a bandwidth varying according to a howling frequency, filtering a signal in a first frequency band from a signal from which howling is to be canceled to generate the input signal.

7. The method of claim 6, further comprising adding signals remaining in the signal from which howling is to be canceled except for the signal in the first frequency band to the output signal.

8. A method of canceling howling, the method comprising canceling howling from an input signal with a bandwidth varying according to a howling frequency to generate an output signal, wherein the canceling of howling from the input signal with a bandwidth varying according to a howling frequency comprises:

performing frequency warping on the input signal;

canceling howling in a howling frequency of the frequency-warped signal with the same bandwidth; and performing frequency dewarping on the howling-canceled signal, and wherein the canceling of howling with the same bandwidth comprises:

estimating the howling frequency in the frequency-warped signal;

canceling howling in the estimated howling frequency with the same bandwidth;

calculating a difference between an energy of a signal prior to cancellation of howling in the estimated howling frequency and an energy of the howling-canceled signal; and outputting the howling-canceled signal if the difference exceeds a threshold value.

9. A variable-bandwidth adaptive notch filter which cancels howling from an input signal with a bandwidth varying according to a howling frequency to generate an output signal, wherein the variable-bandwidth adaptive notch filter comprises:

a feed-forward part and a feed-back part, wherein the cancelling of howling comprises cancelling howling from the input with a variable-bandwidth adaptive notch filter, and wherein the variable-bandwidth adaptive notch filter operates in a narrow bandwidth when the howling frequency occurs in a low frequency spectrum, and operates in a broad bandwidth when the howling frequency occurs in a high frequency spectrum.

10. The variable-bandwidth adaptive notch filter of claim 9, wherein the feed-forward part comprising N frequency warping filters, (N+1) multipliers which apply a variable coefficient to the input signal and N signals which have been frequency-warped from once up to N times, and N adders which add the coefficient-applied signals; and the feed-back part comprising N frequency warping filters, N multipliers which apply a variable coefficient to N signals which have been frequency-warped from once up to the N times, and N adders which add the coefficient-applied signals and the feed-forward signal generated by the feed-forward part, thus generating an output signal.

11. The variable-bandwidth adaptive notch filter of claim 10, wherein a transfer function D(z) of the frequency warping filter is given by:

$$D(z) = \frac{z^{-1} - \lambda}{1 - \lambda z^{-1}},$$

where $\lambda$ is an adjustment parameter for warping a frequency response and is a positive real number less than or equal to 1.

12. The variable-bandwidth adaptive notch filter of claim 11, wherein if N is equal to 2, three multipliers included in the feed-forward part apply a coefficient of 1 to the input signal, a coefficient of −a(n) to a signal obtained by applying a frequency warping filter to the input signal once, and a coefficient of 1 to a signal obtained by applying the frequency warping filter to the input signal twice, two multipliers included in the feed-back part apply a coefficient of a(n)ρ to a signal obtained by applying the frequency warping filter to the output signal once and a coefficient of $\rho^2$ to a signal obtained by applying the frequency warping filter to the output signal twice, and a(n) is a coefficient for determining a howling frequency and ρ is a positive real number less than or equal to 1 and is a parameter for determining a howling cancellation frequency bandwidth of the variable-bandwidth adaptive notch filter.

13. The variable-bandwidth adaptive notch filter of claim 12, wherein a(n) is given by:

$$a(n+1) = a(n) + \mu \frac{z(n)(x(n-1) - \rho y(n-1))}{\|(x(n-1) - \rho y(n-1))\|_2},$$

wherein when a signal $w_0$ and signals $w_1$ through $w_m$ obtained by applying the frequency warping filter to the signal $w_0$ from once up to M times are sequentially input to the variable-bandwidth adaptive notch filter as an input signal x(n), z(n) indicates an output signal of the feed-forward part and y(n) indicates an output signal of the variable-bandwidth adaptive notch filter in which M is a natural number greater than 2.

14. An apparatus for canceling howling, the apparatus comprising a variable-bandwidth adaptive notch filter which cancels howling from an input signal with a bandwidth varying according to a howling frequency to generate an output signal, wherein the variable-bandwidth adaptive notch filter comprises:

a feed-forward part; and a feed-back part, wherein the variable-bandwidth adaptive notch filter cancels howling from the input signal by operating in a narrow bandwidth when the howling frequency occurs in a low frequency spectrum, and operating in a broad bandwidth when the howling frequency occurs in a high frequency spectrum.

15. The apparatus of claim 14, wherein the feed-forward part comprises N frequency warping filters, (N+1) multipliers which apply a variable coefficient to the input signal and N signals which have been frequency-warped from once up to N times, and N adders which add the coefficient-applied signals, and the feed-back part comprising N frequency warping filters, N multipliers which apply a variable coefficient to N signals which have been frequency-warped from once up to N times, and N adders which add the coefficient-applied signals and the feed-forward signal generated by the feed-forward part, thus generating an output signal.

16. The apparatus of claim 15, wherein a transfer function D(z) of the frequency warping filter is given by:

$$D(z) = \frac{z^{-1} - \lambda}{1 - \lambda z^{-1}},$$

where λ is an adjustment parameter for warping a frequency response and is a positive real number less than or equal to 1.

17. The apparatus of claim 16, wherein if N is equal to 2, three multipliers included in the feed-forward part apply a coefficient of 1 to the input signal, a coefficient of −a(n) to a signal obtained by applying a frequency warping filter to the input signal once, and a coefficient of 1 to a signal obtained by applying the frequency warping filter to the input signal twice, two multipliers included in the feed-back part apply a coefficient of a(n)ρ to a signal obtained by applying the frequency warping filter to the output signal once and a coefficient of $\rho^2$ to a signal obtained by applying the frequency warping filter to the output signal twice, and a(n) is a coefficient for determining a howling frequency and ρ is a positive real number less than or equal to 1 and is a parameter for determining a howling cancellation frequency bandwidth of the variable-bandwidth adaptive notch filter.

18. The apparatus of claim 17, wherein a(n) is given by:

$$a(n+1) = a(n) + \mu\frac{z(n)(x(n-1) - \rho y(n-1))}{\|(x(n-1) - \rho y(n-1))\|_2},$$

wherein when a signal $w_0$ and signals $w_1$ through $w_m$ obtained by applying the frequency warping filter to the signal $w_o$ from once up to M times are sequentially input to the variable-bandwidth adaptive notch filter as an input signal x(n), z(n) indicates an output signal of the feed-forward part and y(n) indicates an output signal of the variable-bandwidth adaptive notch filter in which M is a natural number greater than 2.

19. The apparatus of claim 17, further comprising a howling determining unit for determining whether howling is generated, wherein the variable-bandwidth adaptive notch filtering unit estimates the howling frequency in the frequency-warped signal and cancels howling in the estimated howling frequency with the same bandwidth, and the howling determining unit calculates a difference between an energy of a signal prior to howling cancellation in the estimated howling frequency and an energy of the howling-canceled signal, controls the variable-bandwidth adaptive notch filtering unit to output the howling-canceled signal if the difference exceeds a threshold value, and controls the variable-bandwidth adaptive notch filtering unit to output the signal prior to howling cancellation if the difference does not exceed the threshold value.

20. The apparatus of claim 14, further comprising a howling frequency range setting unit which filters a signal in a first frequency band from a signal from which howling is to be canceled to generate the input signal.

21. The apparatus of claim 20, further comprising an adder which adds signals remaining in the signal from which howling is to be canceled, except for the signal in the first frequency band to the output signal.

22. The apparatus of claim 14, wherein the variable-bandwidth adaptive notch filtering unit performs frequency warping on the input signal, cancels howling in a howling frequency of the frequency-warped signal with the same bandwidth, and performs frequency dewarping on the howling-canceled signal.

23. A non-transitory computer-readable recording medium having recorded thereon a program for executing a method of canceling howling, the method comprising canceling howling from an input signal with a bandwidth varying according to a howling frequency to generate an output signal, wherein the cancelling of howling comprises cancelling howling from the input signal with a variable-bandwidth adaptive notch filter, wherein the variable-bandwidth adaptive notch filter operates in a narrow bandwidth when the howling frequency occurs in a low frequency spectrum, and operates in a broad bandwidth when the howling frequency occurs in a high frequency spectrum.

* * * * *